United States Patent
Stachew et al.

(12)

(10) Patent No.: US 6,770,605 B1
(45) Date of Patent: Aug. 3, 2004

(54) MODIFIED POLYISOBUTYLENE SUCCINIMIDE DISPERSANTS HAVING IMPROVED SEAL, SLUDGE, AND DEPOSIT PERFORMANCE

(75) Inventors: Carl F. Stachew, Portage, MI (US); Gordon D. Lamb, Mickleover (GB); William D. Abraham, South Euclid, OH (US); Mary Galic Raguz, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/659,132

(22) Filed: Sep. 11, 2000

(51) Int. Cl.$^7$ .................................. C10M 133/44
(52) U.S. Cl. .................... 508/291; 508/292; 508/293
(58) Field of Search .................. 508/291, 292, 508/293

(56) References Cited

U.S. PATENT DOCUMENTS

| 4,234,435 | A | | 11/1980 | Meinhardt et al. |
| 4,558,170 | A | | 12/1985 | Chen et al. ............... 585/532 |
| 5,053,152 | A | * | 10/1991 | Steckel |
| 5,114,435 | A | * | 5/1992 | Abramo et al. |
| 5,296,560 | A | | 3/1994 | Gutierrez et al. ........ 525/327.6 |
| 5,334,321 | A | * | 8/1994 | Harrison et al. |
| 5,614,480 | A | | 3/1997 | Salomon et al. ............ 508/287 |
| 5,792,730 | A | | 8/1998 | Gutierrez et al. ........... 508/232 |
| 5,821,205 | A | | 10/1998 | Harrison et al. ............ 508/291 |
| 5,936,041 | A | | 8/1999 | Diana et al. ............. 525/327.6 |
| 6,066,605 | A | | 5/2000 | Emert et al. ................ 508/551 |

FOREIGN PATENT DOCUMENTS

| EP | 370 805 A2 | 5/1990 |
| EP | 451 380 A1 | 10/1991 |

* cited by examiner

*Primary Examiner*—Jerry D. Johnson
(74) *Attorney, Agent, or Firm*—David M. Shold; Michael F. Esposito

(57) ABSTRACT

A composition suitable for reducing sludge and degradation of elastomer seals in engines comprises an oil of lubrication viscosity and a minor amount of a sludge preventing/seal protecting nitrogen containing dispersant, which is a reaction product of a hydrocarbyl-substituted succinic acylating agent having a limited amount of low molecular weight substituent; and a polyamine or condensed polyamine containing less than 20 mole percent of polyamine components of 6 or fewer nitrogen atoms.

25 Claims, No Drawings

MODIFIED POLYISOBUTYLENE SUCCINIMIDE DISPERSANTS HAVING IMPROVED SEAL, SLUDGE, AND DEPOSIT PERFORMANCE

FIELD OF THE INVENTION

Internal combustion engines operate under a wide range of temperatures including low temperature stop and go service as well as high temperature conditions produced by continuous high speed driving. Stop and go driving, particularly during cold, damp weather conditions, leads to formation of a sludge in the crankcase and in the oil passages of a gasoline or a diesel engine. This sludge seriously limits the ability of the crankcase oil to lubricate the engine effectively. In addition, the sludge with its entrapped water tends to contribute to rust formation in the engine. These problems tend to be aggravated by the manufacture's lubrication service recommendations which specify extended drain oils.

Another problem facing the lubricant manufacturer is that of seal deterioration in the engine. All internal combustion engines use elastomer seals, such as Viton™ seals, in their assembly. Over time, these seal are susceptible to serious deterioration caused by the lubricating oil composition and the deterioration results in oil leaking from the engine. A lubricating oil composition that degrades the elastomer seals in an engine is unacceptable to engine manufacturers and has limited value.

BACKGROUND OF THE INVENTION

It is known to employ nitrogen containing dispersants and/or detergents in the formulation of crankcase lubricating oil compositions. Many of the known dispersant/detergent compounds are based on the reaction of an alkenylsuccinic acid or anhydride with an amine or polyamine to produce an alkylsuccinimide or an alkenylsuccinamic acid as determined by selected conditions of reaction.

U.S. Pat. No. 4,558,170 (Chen et al., Dec. 10, 1985) is directed to polyisobutylene prepared from a mixed $C_4$ hydrocarbon feedstream using an $AlCl_3$—HCl catalyst system wherein the HCl is introduced separately into the feedstream to form organochloride in the feedstream. Polymer product having a very narrow molecular weight distribution is obtained over the Mn range of 700 to 3,000. Dispersants derived from this polyisobutylene are said to exhibit substantially improved performance in lubricating oil compositions.

U.S. Pat. No. 5,614,480 (Salomon et al., Mar. 25, 1997) describes a lubricating oil composition which comprises a major amount of an oil of lubricating viscosity and (A) at least about 1% by weight of at least one carboxylic derivative composition produced by reacting
  (A-1) at least one substituted succinic acylating agent containing at least about 50 carbon atoms in the substituent with
  (A-2) from about 0.5 equivalent up to about 2 moles, per equivalent of acylating agent (A-1), of at least one amine compound characterized by the presence within its structure of at least one HN< group; and
(B) at least one alkali metal overbased salt of a hydrocarbyl-substituted carboxylic acid or a mixture of a hydrocarbyl carboxylic acid and a hydrocarbyl-substituted sulfonic acid having a metal ratio of greater than 2 in an amount sufficient to provide at least about 0.002 equivalent of alkali metal per 100 grams of the lubricating oil composition wherein the hydrocarbyl substituent of the carboxylic acid contains at least about 50 carbon atoms.

U.S. Pat. No. 5,792,730 (Gutierrez et al., Aug. 11, 1998) is directed to the reaction product of hydrocarbons or polymers functionalized by halogenation (e.g. chlorination), thermal "ene" reaction or free radical grafting and derivatized with a heavy polyamine. A heavy polyamine is a mixture of polyalkylenepolyamines comprising small amounts of lower polyamine oligomers such as tetraethylene pentamine and pentahexamine but primarily oligomers with 7 or more nitrogens, 2 or more primary amines per molecule, and more extensive branching than conventional polyamine mixtures.

U.S. Pat. No. 5,936,041 (Diana et al., Aug. 10, 1999) pertains to improved lubricating oil dispersants wherein a fractionating polymer is prepared prior to functionalization (e.g. in the Koch reaction) for making dispersant additives. In one aspect, it was discovered that by fractionating a polymer to remove light hydrocarbon and unreacted monomer from the polymer before the carbonylation step of the Koch reaction, the amount of light ester impurities generated was minimized. Light ester is an undesirable byproduct that adversely affects the recycle of the catalyst from the functionalization step of the Koch reaction. The reference also pertains to improved lubricating oil nitrogen-containing dispersant additives derived from fractionated polymer.

SUMMARY OF THE INVENTION

The present invention provides a composition suitable for reducing engine sludge and degradation of elastomer seals comprising
  a major amount of an oil of lubricating viscosity and
  a minor amount of a nitrogen-containing dispersant wherein the nitrogen containing dispersant is a reaction product of
  (I) a hydrocarbyl-substituted succinic acylating agent, wherein no more than about 20 mole percent of the individual molecules thereof have a hydrocarbyl substituent with a molecular weight of less than 500; wherein the hydrocarbyl substituent is a polymeric species consisting essentially of olefin monomer units of at least 3 carbon atoms; and
  (II) at least one polyamine, wherein the polyamine is
(a) a polyalkylene amine containing at least one H—N< group; or
(b) a condensate of (i) a polyalkylene amine containing at least one H—N< group with (ii) at least one alcohol containing at least one ether group, amine group, nitro group, or additional alcohol group;
  wherein in said polyamine (a) or condensed polyamine (b) no more than about 20 mole percent of the molecules contain 6 or fewer nitrogen atoms.

By means of an alternative description, the hydrocarbyl-substituted succinic acylating agent (I) is an agent wherein the hydrocarbyl substituent is prepared from a polymeric species consisting essentially of olefin monomer units of at least 3 carbon atoms and wherein no more than about 20 mole percent of the individual molecules of said polymeric species have a molecular weight of less than 500.

The invention also provides a method for reducing the formation of sludge and the degradation of seals in an engine, comprising lubricating the engine with the above-described composition.

DETAILED DESCRIPTION OF THE INVENTION

Oil of Lubricating Viscosity

The diverse oils of lubricating viscosity include natural and synthetic lubricating oils and mixtures thereof.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils such as polymerized and interpolymerized olefins (e.g., polybutylenes, polypropylenes, propylene-isobutylene copolymers, poly(1-hexenes, poly(1-octenes), poly(1-decenes), and mixtures thereof); alkylbenzenes (e.g., dodecylbenzenes, tetra-decylbenzenes, dinonylbenzenes, di(2-ethylhexyl)-benzenes); polyphenyls (e.g., biphenyls, terphenyls, alkylated polyphenyls), alkylated diphenyl ethers and alkylated diphenyl sulfides and the derivatives, analogs and homologs thereof.

Alkylene oxide polymers and interpolymers and derivatives thereof where the terminal hydroxyl groups have been modified by, e.g., esterification or etherification constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polyethylene glycol having a molecular weight of 500–1,000, diethyl ether of polypropylene glycol having a molecular weight of 1,000–1,500) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, or alkenyl malonic acids) with a variety of alcohols (e.g., butyl alcohol, hexyl alcohol, dodecyl alcohol, 2-ethylhexyl alcohol, ethylene glycol, diethylene glycol monoether, or propylene glycol). Specific examples of these esters include dibutyl adipate, di(2-ethylhexyl sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, or dipentaerythritol, tripentaerythritol.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such a solvent extraction, acid or base extraction, filtration, or percolation. Rerefined oils are obtained by processes similar to those used to obtain refined oils which have been already used in service. Such rerefined oils are also known as reclaimed or reprocessed oils and often are additionally processed by techniques directed to removal of spent additives and oil breakdown products.

The aliphatic and alicyclic substituents, as well as aryl nuclei, are generally described as "hydrocarbon-based" or "hydrocarbyl." These terms are used in their ordinary sense, which is well-known to those skilled in the art. Specifically, they refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(2) substituted hydrocarbon substituents, that is, substituents containing non-hydrocarbon groups which, in the context of this invention, do not alter the predominantly hydrocarbon substituent (e.g., halo (especially chlorb and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

(I) The Hydrocarbyl-Substituted Succinic Acylating Agent

The hydrocarbyl-substituted succinic acylating agents are well known in the art. See, for example, the following U.S. Patents for their disclosures relating to carboxylic acid acylating agents: U.S. Pat. Nos. 3,219,666; 3,272,746; 3,381,022; 3,254,025; 3,278,550; 3,288,714; 3,271,310; 3,373,111; 3,346,354; 3,272,743; 3,374,174; 3,307,928; 3,394,179; and 4,234,435.

The substituted succinic acylating agents are those which can be characterized by the presence within their structure of two groups or moieties. The first group or moiety is referred to herein, for convenience, as the "substituent group(s)" and is derived from a polyalkene. The polyalkene from which the hydrocarbyl-substituent groups are derived is characterized by a $\overline{M}_n$ (number average molecular weight) value. Since the substituent as a whole is normally a mixture of individual chains of varying lengths, these substituent groups are characterized by having not more than 20 mole percent, preferably not more than 15 mole percent and most preferably not more than 10 mole percent of individual substituent chains with a $\overline{M}_n$ of less than 500. Typically the substituent groups as a whole will have a $\overline{M}_n$ value of 1000 to 10,000, preferably 1300, 1500, or 2000 to 5000. Most preferably the $\overline{M}_n$ is at least 2000. In another highly favored embodiment, the substituent groups will contain not more than 5 mole percent of substituent groups which have a $\overline{M}_n$ of below 300.

The polyalkenes from which the substituent groups are derived are homopolymers and interpolymers of polymerizable olefin monomers of 3 to 16 carbon atoms; usually 3 to 6 carbon atoms. The interpolymers are those in which two or more olefin monomers are interpolymerized according to known procedures to form polyalkenes having units within their structure derived from each of said two or more olefin monomers. Thus, "interpolymer(s)" as used herein is inclusive of copolymers, terpolymers, tetrapolymers, and higher degree polymers. As will be apparent to those of ordinary skill in the art, the polyalkenes from which the substituent groups are derived are often conventionally referred to as "polyolefin(s)".

The olefin monomers from which the polyalkenes are derived are polymerizable olefin monomers characterized by the presence of one or more ethylenically unsaturated groups (i.e., >C=C<); that is, they are mono-olefinic monomers such as propylene, 1-butene, isobutene, and 1-octene or polyolefinic monomers (usually diolefinic monomers) such as 1,3-butadiene, and isoprene. Preferred polyolefins include polybutene, polypropylene, and mixtures thereof. Ethylene polymers are not generally contemplated for the present invention nor are copolymers of ethylene with another higher olefin monomer, unless the amount of ethylene monomer within the polymer is inconsequential, e.g., less than 10 percent by weight preferably less than 5%, and more preferably less than 2%, and most preferably about 0%. A particularly preferred substituent is derived from polybutene in which at least about 50 mole percent of the butene monomer units are isobutylene units.

These olefin monomers are usually polymerizable terminal olefins; that is, olefins characterized by the presence in their structure of the group >C=CH$_2$. However, polymerizable internal olefin monomers (sometimes referred to in the patent literature as medial olefins) characterized by the presence within their structure of the group

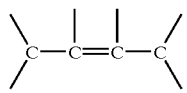

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention. The polyolefins are preferably prepared from predominantly terminal olefins. In this context, "predominantly" means that at least 60% of the olefins, and preferably at least 75% or 90% of the olefins are terminal olefins.

While the polyalkenes from which the substituent groups of the succinic acylating agents are derived generally are hydrocarbon polyalkenes, they can contain non-hydrocarbon groups such as lower alkoxy, lower alkyl mercapto, hydroxy, mercapto, oxo (i.e., =O, as in keto and aldehydo groups; e.g.,

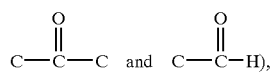

nitro, halo, cyano, carboalkoxy (i.e.,

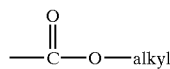

where "alkyl" is usually lower alkyl) alkanoyloxy (i.e.,

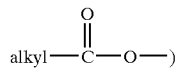

where alkyl is usually lower alkyl, provided the non-hydrocarbon substituents do not substantially interfere with formation of the substituted succinic acid acylating agents of this invention. When present, such non-hydrocarbon groups normally will not contribute more than 10% by weight of the total weight of the polyalkenes. Since the polyalkene can contain such non-hydrocarbon substituent, it is apparent that the olefin monomers from which the polyalkenes are made can also contain such substituents. Normally, however, as a matter of practicality and expense, the olefin monomers and the polyalkenes will be free from non-hydrocarbon groups, except chloro groups which usually facilitate the formation of the substituted succinic acylating agents of this invention. (As used herein, the term "lower" when used with a chemical group such as in "lower alkyl" or "lower alkoxy" is intended to describe groups having up to seven carbon atoms.)

Although the polyalkenes may include aromatic groups (especially phenyl groups and lower alkyl- and/or lower alkoxy-substituted phenyl groups such as para-(tert-butyl) phenyl) and cycloaliphatic groups such as would be obtained from polymerizable cyclic olefins or cycloaliphatic substituted-polymerizable acyclic olefins, the polyalkenes usually will be free from such groups. Nevertheless, polyalkenes derived from interpolymers of both 1,3-dienes and styrenes such as 1,3-butadiene and styrene or para-(tert-butyl)styrene are exceptions to this generalization. Again, because aromatic and cycloaliphatic groups can be present, the olefin monomers from which the polyalkenes are prepared can contain aromatic and cycloaliphatic groups.

From what has been described hereinabove in regard to the polyalkene, it is clear that there is a general preference for aliphatic, hydrocarbon polyalkenes free from aromatic and cycloaliphatic groups (other than the diene-styrene interpolymer exception already noted). Within this general preference, there is a further preference for polyalkenes which are derived from the group consisting of homopolymers and interpolymers of terminal hydrocarbon olefins of 2 to 16 carbon atoms. This further preference is qualified by the proviso that, while interpolymers of terminal olefins are usually preferred, interpolymers optionally containing up to 40% of polymer units derived from internal olefins of up to 16 carbon atoms are also with a preferred group. A more preferred class of polyalkenes includes those selected from the group consisting of homopolymers and interpolymers of terminal olefins of 2 to 6 carbon atoms, more preferably 2 to 4 carbon atoms. However, another preferred class of polyalkenes are polyalkenes, optionally containing up to 25% of polymer units derived from internal olefins of up to 6 carbon atoms.

Specific examples of terminal and internal olefin monomers which can be used to prepare the polyalkenes according to conventional, well-known polymerization techniques include propylene; 1-butene; 2-butene; isobutene; 1-pentene; 1-hexene; 1-heptene; 1-octene; 1-nonene; 1-decene; 2-pentene; propylene-tetramer; diisobutylene; isobutylene trimer; 1,2-butadiene; 1,3-butadiene; 1,2-pentadiene; 1,3-pentadiene; 1,4-pentadiene; isoprene; 1,5-hexadiene; 2-methyl-1-heptene; 3-cyclohexyl-1-butene; 2-methyl-5-propyl-1-hexene; 3-pentene; 4-octene; 3,3-dimethyl-1-pentene; styrene; divinylbenzene; vinyl acetate; allyl alcohol; 1-methyl-vinyl acetate; acrylonitrile; ethyl acrylate; methyl methacrylate; ethyl vinyl ether; and methyl vinyl ketone. Of these, the hydrocarbon polymerizable monomers are preferred and of these hydrocarbon monomers, the terminal olefin monomers are particularly preferred.

Specific examples of polyalkenes include polypropylenes, polybutenes, styrene-isobutene copolymers, isobutene-1,3-butadiene copolymers, propene-isoprene copolymers, isobutene-chloroprene copolymers, isobutene-(para-methyl) styrene copolymers, copolymers of 1-hexene with 1,3-hexadiene, copolymers of 1-octene with 1-hexene, copolymers of 1-heptene with 1-pentene, copolymers of 3-methyl- 1-butene with 1-octene, copolymers of 3,3-dimethyl-1-pentene with 1-hexene, and terpolymers of isobutene, styrene and piperylene. More specific examples of such interpolymers include copolymer of 95% (by weight) of isobutene with 5% (by weight) of styrene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene-1; and terpolymer of 90% of isobutene with 2% of cyclohexene and 8% of propylene. A preferred source of polyalkenes are the poly(isobutene)s obtained by polymerization of $C_4$ refinery stream having a butene content of 35 to 75 percent by weight and an isobutene content of 30 to 60 percent by weight in the presence of a Lewis acid catalyst such as aluminum trichloride or boron trifluoride. These polybutenes contain predominantly (greater than 80% of the total repeating units) of isobutene repeating units of the configuration

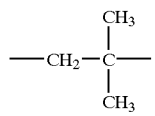

Preparing polyalkenes as described above which meet the various criteria for $\overline{M}_n$ and $\overline{M}_w/\overline{M}_n$ is within the skill of the art. Techniques readily apparent to those in the art include controlling polymerization temperatures, regulating the amount and type of polymerization initiator and/or catalyst, and employing chain-terminating groups in the polymerization procedure.

A preferred polyalkene is polyisobutene (PBU) prepared by polymerizing isobutylene. This polyisobutene, as typically prepared, contains of 25.3 mole percent of material having molecular weight below 500 and 14.3 mole percent of material having molecular weight below 300. These mole percent values indicate a presence of relatively large amounts of low molecular weight material, also known as a high presence of "light ends." In order to remove the light ends, the polyisobutene is subjected to a stripping at 240° C. and 130 Pa (1 mm Hg). When 8064 parts of unstripped polyisobutene are subjected to a stripping under the above conditions, 227 parts of distillate or light ends are removed.

Table I presents gel permeation chromatography data of $\overline{M}_n$ ranges of the unstripped polyisobutene and the stripped polyisobutene. $\overline{M}_n$ values are determined by comparison with a standard broad molecular weight distribution polyisobutylene sample, which in turn is standardized by comparison with a series of narrow molecular weight distribution polyisobutylene standards.

TABLE I

| | Unstripped Polyisobutene | | Stripped Polyisobutene | |
|---|---|---|---|---|
| $\overline{Mn}$ | weight % | mole % | weight % | mole % |
| <300 | 1.6 | 14.3 | 0.4 | 3.9 |
| <500 | 3.7 | 25.3 | 2.4 | 15.0 |
| 500–1000 | 6.8 | 18.8 | 7.0 | 21.7 |
| <1000 | 10.6[a] | 44.1 | 9.4 | 36.7 |
| 1000–1500 | 8.9 | 14.7 | 9.8 | 17.8 |
| 1500–2000 | 9.6 | 11.2 | 8.7 | 11.3 |
| >2000 | 70.9 | 30.0 | 72.1 | 34.2 |

([a]. Numbers may not add to values shown due to rounding)

Two types of hydrocarbyl substituted succinic acylating agents are envisioned as Type A and Type B. The Type A succinic acylating agent is of the formula

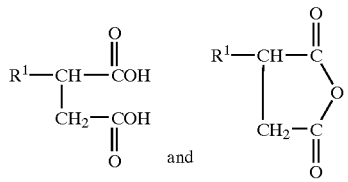

Formula Ia

In the above formula, $R^1$ is the hydrocarbyl based substituent, as discussed above, preferably having 40 to 500 carbon atoms and more preferably 50 to 300 carbon atoms. The Type A hydrocarbyl-substituted succinic acylating agents are prepared by reacting one mole of an olefin polymer or chlorinated analog thereof with one mole of an unsaturated carboxylic acid or derivative thereof such as fumaric acid, maleic acid or maleic anhydride. Typically, the Type A succinic acylating agents are derived from maleic acid, its isomers, anhydride and chloro and bromo derivatives.

For the Type A succinic acylating agent, the polyalkene from which the substituent groups are derived has an $\overline{M}_n$ value of generally as described above, that is, 1000 to 10,000. Preferably, the $\overline{M}_n$ value is 1300, 1500, or 1800 to 5000 or 3200, and most preferably 2000 to 2800.

The Type A succinic acylating agent is characterized by one mole of olefin polymer or chlorinated analog thereof with one mole of an unsaturated carboxylic acid or derivative thereof. The Type B succinic acylating agent, on the other hand, is a polysuccinated acylating agent. The succinic groups correspond to

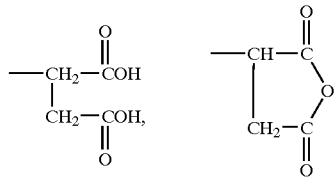

Formula Ib and mixtures thereof.

The Type B succinic acylating agents can be represented by the following

wherein $R^1$ represents one molecular weight of substituent group, $R^2$ represents one succinic group corresponding to Formula Ib, as discussed above, and y is a number equal to or greater than 1.1 or equal to or greater than 1.3. Preferred embodiments of the Type B succinic acylating agents could be represented by, for example, letting $R^1$ and $R^2$ represent preferred substituent groups and succinic groups, respectively, and by letting the value of y vary. In the above formula, y is preferably equal to or greater than 1.4; and more preferably y is equal to or greater than 1.5. As to preferred upper and lower limits, y can be 1.3 to 3.5, especially 1.4 to 3.5 and most especially 1.5 to 2.5.

The hydrocarbyl-based substituent used for the Type B succinic acylating agent is generally the same as that which is used for the hydrocarbyl-based substituent used for the Type A succinic acylating agent. The $\overline{M}_n$ value for the hydrocarbyl-based substituent for both Type A and Type B succinic acylating agents is typically 1000 to 10,000, as described above. For the hydrocarbyl-based substituent for the Type B succinic acylating agent, the $\overline{M}_n$ is preferably 1800 to 3200 and more preferably 2000 to 2800.

Specific examples for the preparation of the Type A and Type B succinic acylating agents, respectively, are as follows.

EXAMPLE 1 (COMPARATIVE)

(Type A, with Unstripped PBU)

Added to a 5 liter, 4 neck flask are 2036 parts (1 mole) unstripped PBU and 107.8 (1.1 moles) maleic anhydride. The contents are heated to 138° C. and chlorine gas is blown below the surface over a 5 hour period with the chlorine addition being 43 parts (0.61 moles) while raising the temperature from 138° C. to 165° C.; the temperature is then increased to 182° C. over 2 hours and held at 182° C. for 1 hour. Additional chlorine gas, 42.9 parts (0.60 moles) is blown below the surface over 5 hours while raising the temperature from 182 to 193° C. The contents are then heated to 196° C. over 1 hour and maintained at 196° C. for 5 hours. The contents are stripped at 196° C. and less than 1.3 kPa (10 mm Hg). The contents are cooled and bottled to give a product having a theoretical total acid number of 51 and theoretical 9% unreacted PBU.

EXAMPLE 2

(Type A, with Stripped PBU)

The procedure of Example 1 is repeated except that 2300 parts (1 mole) stripped PBU, 107.8 parts (1.1 moles) maleic anhydride and a total of 85.9 parts (1.21 moles) chlorine gas are utilized. The contents have a theoretical total acid number of 47 and theoretical 10% unreacted PBU.

EXAMPLE 3 (COMPARATIVE)

(Type B, with Unstripped PBU)

Charged to a 12 liter, 4-neck flask are 7940 parts (3.9 moles) unstripped PBU and 592 parts (6.05 moles) maleic anhydride. The contents are heated to 138° C. and chlorine gas is added below the surface over a five-hour period, with the chlorine addition being 234 parts (3.3 moles). During this addition, the temperature is uniformly raised from 138 to 165° C.; the temperature is then raised from 165 to 182° C. over 2 hours and held at 182° C. for 1 hour. While raising the temperature from 182 to 193° C., chlorine gas, 236 parts (3.3 moles) is added below the surface. The temperature is increased from 193 to 196° C. over 1 hour and held at 196° C. for 5 hours. Afterwards, the contents are stripped at 196° C. and 4 kPa (30 mm Hg) to remove unreacted maleic anhydride. The contents have a 0.207% chlorine, 0.53% free maleic anhydride, and a total acid number of 68.

EXAMPLE 4

(Type B, with Stripped PBU)

The procedure of Example 2 is repeated except that 7834 parts (3.4 moles) stripped PBU, 517 parts (5.3 moles) maleic anhydride, and a total of 410 parts (5.8 moles) chlorine gas are utilized. The contents have a % chlorine of 0.174, % free maleic anhydride of 0.22 and a total acid number of 60.

(II) The Polyamine

Two different types of polyamines are suitable for reacting with the hydrocarbyl-substituted succinic acylating agent (I). The first polyamine is (IIa), a polyalkylene polyamine containing at least one H—N< group (that is, an amine group containing at least one hydrogen, i.e., a primary or secondary amine), wherein no more than 20 mole percent of the molecules thereof contain 6 or fewer nitrogen atoms, and preferably no more than 10 or 5 mole percent of the molecules contain 6 or fewer nitrogen atoms. This class of polyamines can be represented by the formula

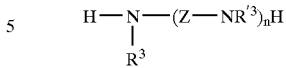

Formula IIa in which each $R^3$ is independently hydrogen or an alkyl group of 1 to 10 carbon atoms; Z is an alkylene group of 1 to 10 carbon atoms, a heterocyclic nitrogen containing cycloalkylene or an oxyalkylene group of 1 to 10 carbon atoms and n is a number in the range of 1 to 10, provided that not more than 20 mole percent of the polyamine molecules have 6 or fewer nitrogen atoms. In a preferred embodiment, Z is an alkylene group and the preferred alkylene is ethylene or propylene. Useful are the alkylene polyamines wherein each $R^3$ is hydrogen with the ethylene polyamines, and mixtures of ethylene polyamines are particularly preferred. Usually n will have an average value of 5 to 7 with the understanding that some species of ethylene polyamines wherein n is 1 to 4 may be present, provided that their presence contributes not more than 20 mole percent molecules with 6 or fewer nitrogen atoms. Such alkylene polyamines include ethylene polyamines, propylene polyamines, butylene polyamines, pentylene polyamines, hexylene polyamines, and heptylene polyamines. The higher homologs of such amines and related aminoalkyl-substituted piperazines are also included.

Alkylene polyamines that that may be present—but only at the lower levels permitted for the present compositions—include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, N-(2-aminoethyl) piperazine, and 1,4-bis(2-aminoethyl) piperazine. Higher homologs can be obtained by condensing two or more of the above-illustrated materials.

Polyethylene amines (i.e., ethylene polyamines) are preferred, and such polyamines are described in detail under the heading "Diamines and Higher Amines" in the Encyclopedia of Chemical Technology, Second Edition, Kirk and Othmer, Volume 7, pages 27–39, Intrascience Publishers, Division of John Wiley and Sons, 1965. Such compounds are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines.

The polyalkylene polyamines (IIa) which are particularly suitable for the present invention can be obtained by subjecting a standard polyamine mixture containing at least 40 percent by weight of materials of 7 nitrogen atoms or more, to a stripping procedure. Such a standard polyamine mixture would typically have 60 weight percent materials containing 6 or fewer nitrogen atoms. Lower molecular weight polyamines and volatile contaminates are thereby removed from this alkylene polyamine mixture to leave as residue what is sometimes termed "polyamine bottoms" (although sometimes this term is used commercially to refer to unstripped materials). In general, stripped alkylene polyamine bottoms can be characterized as having less than 20 mole percent of polyamine components containing 6 or fewer nitrogen atoms, preferably, less than 10 mole percent of polyamine components of six or fewer nitrogen atoms, and most preferably less than 5 mole percent of polyamine components of six or fewer nitrogen atoms.

Table II, below, defines the polyethylene polyamine profile of a standard, commercial polyethylene polyamine composition in comparison to two stripped polyethylene polyamines. The values represented are average values.

TABLE II

| Source of Polyethylene Polyamine: | # of N Atoms from Formula IIa | | | |
|---|---|---|---|---|
| | $\leq 4$ | 5 | 6 | $\geq 7$ |
| Standard Polyamine | 3.2 | 14.6 | 46.0 | 36.2 |
| Standard Polyamine (HPA-X ™) | 1.41 | 16.35 | 41.64 | 40.60 |
| Stripped Polyamine "X" | 0.15 | 0.81 | 4.19 | 94.85 |
| Stripped Polyamine "PF" | 0.62 | 0.50 | 5.03 | 93.85 |

The second polyamine IIb is a condensed polyamine, that is, a condensate formed by reacting (i) a polyalkylene amine containing at least one H—N< group (as described above) with (ii) at least one alcohol containing at least one ether group, amine group, nitro group, or additional alcohol group. Such alcohols of (ii) can be expressed generally by the formula $$R^1_m—X—R^2—(R^3OH)_n$$

wherein:

X is O or N;

m is 1 when X is O and 2 when X is N;

each $R^1$ is independently hydrogen, a hydrocarbyl group, a hydroxy-hydrocarbyl group, or, if X is N, each $R^1$ can be O so as to form a $NO_2$ group;

$R^2$ is a hydrocarbylene group or an ether-containing group, having n+1 sites of linkage $R^3$ is an alkylene group of 1 to about 4 carbon atoms; and n is 1, 2, or 3.

The hydrocarbylene group $R^2$ is a hydrocarbyl group or ether-containing group which, as stated above, has sufficient valences or sites of linkage to bond to the $R^1_m X$ group and 1, 2, or 3 $R^3OH$ groups. Thus this term is used in a somewhat broader sense than the analogous term "alkylene," which is sometimes used to represent a group having only two sites of linkage (e.g., methylene, —$CH_2$—; propylene, —CH($CH_3$)—$CH_2$—.) Also included within the scope of this definition of "hydrocarbylene" as applied to $R^2$ is the possibility that, when n=3, the $R^2$ can represent a central carbon atom without additional hydrogen or hydrocarbyl substituents, as follows:

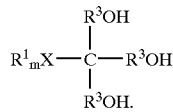

A general alternative term which might be used in this context in place of "hydrocarbylene" would be "carbon-based linking group."

Such condensed polyamines and methods for their preparation are described in U.S. Pat. Nos. 4,477,362, 5,368,615, and 5,053,152. In these and related patents, a variety of formulas and definitions have been used to describe the condensed materials and in particular their alcohol components. At least two alternative definitions of the alcohol component may be useful for illustrating a part of the breadth of the present invention. Thus, one embodiment of the alcohol can be that expressed below as Formula IIb1:

$$HO—(R^5O—)_p R^6—OR^7 \qquad \text{Formula IIb1}$$

wherein $R^5$ and $R^6$ are independently alkylene groups of 2 to 8 carbon atoms, $R^7$ is aryl, hydrocarbyl-substituted aryl, alkyl or aralkyl, and p is 0 to 8. Another expression is in Formula IIb2:

$$(R^8)_q—Y—X—(AOH)_m \qquad \text{Formula IIb2}$$

wherein $R^8$ is independently hydrogen or a hydrocarbyl group, Y represents nitrogen or oxygen, X is a hydrocarbon-based group, A is an alkylene group containing 1 to 4 carbon atoms, q is 1 or 2, dependent upon the valence of Y, and m is 1, 2 or 3. Among these types of hydroxy compounds that can react with the polyamine to form the condensed polyamine, the hydroxy compound of Formula IIb1 can be an alkoxylated monohydroxy compound and the hydroxy compound of Formula IIb2 can be a polyhydroxy compound (polyol).

The hydroxy compounds of Formula IIb1 can be polyoxyalkylene alcohols (sometimes called polyglycols). Preferably $R^5$ and $R^6$ are each independently ethylene, propylene or butylene groups such that these hydroxy compounds are polyoxyethylene alcohols, polyoxypropylene alcohols and polyoxybutylene alcohols. These polyoxyalkylene alcohols can contain up to 150 oxyalkylene groups, with the alkylene group containing from 2 to 8 carbon atoms. Such polyoxyalkylene alcohols are generally dihydric alcohols. That is, each end of the molecule terminates with an OH group. Any remaining OH group(s) are esterified with a monobasic, aliphatic or aromatic carboxylic acid of up to 20 carbon atoms such as acetic acid, propionic acid, oleic acid, stearic acid, and benzoic acid. The monoethers of these alkylene glycols and polyoxyalkylene glycols are also useful. These include the monoaryl ethers, monoalkyl ethers, and monoaralkyl ethers of these alkylene glycols and polyoxyalkylene glycols.

Within Formula IIb1, $R^5$ and $R^6$ are independently alkylene groups of 2 to 8 carbon atoms and preferably are ethylene groups; and $R^7$ is aryl (e.g., phenyl), lower alkoxy phenyl, or lower alkyl phenyl, or lower alkyl (e.g., ethyl, propyl, t-butyl, pentyl); and aralkyl (e.g., benzyl, phenethyl, phenylpropyl, p-ethylphenethyl); p is from zero to eight, preferably from 2 to 4. Polyoxyalkylene glycols in which the alkylene groups are ethylene or propylene and p is at least 2, as well as the monoethers thereof as described above, are particularly useful.

The polyhydroxy alcohols of Formula IIb2 can contain 2 to 10 hydroxy groups. These are illustrated, for example, by the alkylene glycols and polyoxyalkylene glycols mentioned above such as ethylene glycol, diethylene glycol, triethylene glycol, tripropylene glycol, dibutylene glycol, tributylene glycol, and other alkylene glycols and polyoxyalkylene glycols in which the alkylene groups contain from 2 to 8 carbon atoms.

Useful alcohols also include those polyhydric alcohols containing up to 12 carbon atoms, and especially those containing 3 to 10 carbon atoms. This class of alcohols includes glycerol, trimethylolpropane, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, quinic acid, 2,2,6,6-tetrakis (hydroxymethyl) cyclohexanol, 1,10-decanediol, and digitalose. Aliphatic alcohols containing at least 3 hydroxyl groups and up to 10 carbon atoms are useful. Among the most preferred hydroxy compounds of Formula IIb2 are those in which $R^8$ is hydrogen, Y is oxygen, X is —$CCH_2$—, A is —$CH_2$—, q is 1, and m is 3, which gives pentaerythritol; and those in which $R^8$ is hydrogen, Y is nitrogen, X is —C—, A is —$CH_2$—, q is 2, and m is 3, which gives tris(hydroxymethyl) aminomethane (THAM). Also useful are tris(hydroxyethyl) aminomethane, diethanolamine, and triethanolamine.

In preparing the condensed polyamine it is not necessary to utilize a stripped or deep stripped polyethylene polyamine to react with the hydroxy compound. Standard polyethylene polyamines can be used. After the condensed polyamine is prepared, however, it may be necessary to subject the condensed polyamine to stripping so that the condensed polyamine contains less than 20 mole percent of components of 6 or fewer nitrogen atoms. Usually when the polyamines are reacted with any of the above hydroxy compounds, the light end components that are present in the polyamine will react with the hydroxy compound and condense. The condensation reaction can be monitored by the amount of water formed. For example, when 3 moles of diethylenetriamine are reacted with 1 mole of pentaerythritol, the condensed polyamine reaction product will contain 9 nitrogen atoms, shown below in somewhat idealized fashion:

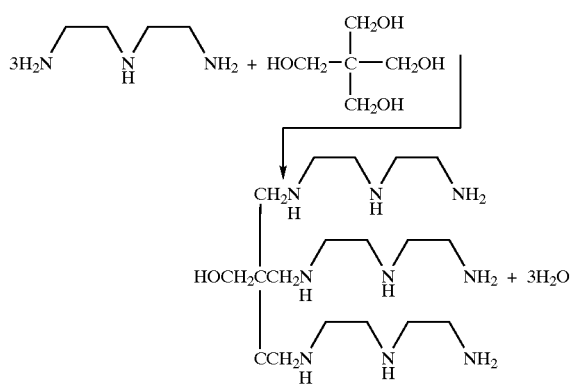

The following are the preparation of the condensed polyamines using a hydroxy compound of Formula IIb2.

EXAMPLE 5

A mixture of 1000 parts of HPA-X™ (a product of Union Carbide identified as a polyamine bottoms product having a nitrogen content of 31.5% by weight and an average base number of 1180) and 613 parts by weight of trishydroxymethyl aminomethane ("THAM") are heated and stirred to 82° C. Added are 15.9 parts of an 85% by weight phosphoric acid aqueous solution and the contents are heated to 229° C. The contents are held at 229° C. for 10 hours to form a condensed polyamine. When the 10 hour hold is completed, low molecular weight amines are removed over a 6 hour period while maintaining the temperature at 235° C. At the end of the 6 hour hold, the contents are cooled to 93° C. and added is 22.1 parts of a 50% weight aqueous solution of sodium hydroxide. The resulting product is a condensed polyamine having the following properties: viscosity at 100° C. of 90 cSt; total base number of 730 and nitrogen content of 27%.

EXAMPLE 6

The procedure of Example 5 is repeated except that 690 parts pentaerythritol is used in place of the THAM to form a condensed polyamine.

The composition of this invention comprises the reaction product of (I) the acylating agent with (II) the polyamine to form the nitrogen-containing dispersant. The acylating agent and the polyamine are reacted in amounts sufficient to provide from one-half equivalent to 2 equivalents of polyamine per equivalent of acylating agent. An equivalent of polyamine is that amount of amine divided by the total number of nitrogen atoms present. Thus, a pure pentaethylenehexamine (PEHA) has an equivalent weight equal to its molecular weight divided by the 6 nitrogen atoms present, or 232÷6=38.67 equivalent weight. Since polyamines are usually a mixture, a more reliable method is to use the % nitrogen of the polyamine to determine equivalent weight, thus pure PEHA has a % nitrogen of 36.21 and the equivalent weight of PEHA is determined by dividing 100 x the molecular weight of nitrogen (1400) by the % N in the sample. Thus using this method, the equivalent weight of PEHA is, again, 1400÷36.21=38.67.

The number of equivalents of acylating agent depends on the number of carboxylic functions present as the succinic groups of Formula Ib. In general, however, there are two equivalents of acylating agent for each succinic group in the acylating agents. A conventional technique used to determine the number of carboxyl functions in the acylating agent is an acid number. The equivalent weight of the acylating agent using the acid number of the acylating agent is determined by dividing 56,100 by the acid number. Thus, an acylating agent having an acid number of 68 has for its equivalent weight 56,100÷68=825.

EXAMPLE 7 (COMPARATIVE)

Charged to a 12 liter, 4 neck round bottom flask are 2640 parts (3.2 equivalents) of the alkenyl substituted succinic anhydride made from unstripped PBU as per Example 3 and 2784 parts diluent oil. The contents are heated to 110° C. and 172.6 parts (4.16 equivalents) of HPA-X polyamines identified in Example 5 (not condensed) are added in 1 hour. This polyamine contains 41.6 mole percent of polyamine components having 6 or fewer nitrogen atoms. The temperature is increased to 155° C. and held there for 5 hours while blowing with nitrogen at 14 L/hour (0.5 cubic feet per hour). The contents are then filtered using a filtering aid to give a product having 0.982% nitrogen, a total acid number of 1.62 and total base number of 20.0.

EXAMPLE 8 (COMPARATIVE)

Charged to a 12 liter, 4 neck round bottom flask are 2618 parts (2.8 equivalents) of the alkenyl substituted succinic anhydride made from stripped PBU as prepared in Example 4 and 2744 parts diluent oil. The contents are heated to 110° C. and 151.1 parts (3.64 equivalents) HPA-X™ polyamines are added in 1.5 hours. The temperature is increased to 155° C. and held there for 5 hours while blowing with nitrogen at 14 L/hr (0.5 cubic feet per hour). The contents are then filtered with a filtering aid to give a product having 0.862% nitrogen, a total acid number of 1.33 and a total base number of 17.70.

EXAMPLE 9 (COMPARATIVE)

Charged to a 12 liter, 4 neck round bottom flask are 2252 parts (2.73 equivalents) of the unstripped alkenyl substituted succinic anhydride as prepared in Example 3 and 2383 parts diluent oil. The contents are heated to 110° C. and 154.1 parts (3.55 equivalents) of a stripped polyamine are added in 1 hour. The polyamine has 4.19 mole percent components of 6 or fewer nitrogen atoms. The temperature is increased to 155° C. and held there for 5 hours while blowing with nitrogen at 14 L/hr (0.5 cubic feet per hour). The contents are then filtered using a filtering aid to give a product having 0.951% nitrogen, a total acid number of 2.49 and a total base number of 20.0.

EXAMPLE 10

Charged to a 12 liter, 4 neck round bottom flask are 2431 parts (2.6 equivalents) of the alkenyl substituted succinic anhydride made from stripped PBU as prepared in Example 4 and 2554 parts diluent oil. The contents are heated to 110° C. and 146.7 parts (3.38 equivalents) of the stripped polyamine used in Example 9 are added in 1 hour. The temperature is increased to 155° C. and held there for 5 hours while blowing with nitrogen at 14 L/hr (0.5 cubic feet per hour). The contents are filtered using a filtering aid to give a product having 0.89% nitrogen, total acid number of 1.99 and total base number of 16.20.

EXAMPLE 11 (COMPARATIVE)

Charged to a 12 liter, 4 neck round bottom flask are 3094 parts (3.75 equivalents) of the unstripped alkenyl substituted succinic anhydride as prepared in Example 3 and 3286 parts diluent oil. The contents are heated to 110° C. and 256.2 parts (4.88 equivalents) of the condensed polyamine as prepared in Example 5 are added in 1 hour. It is calculated that the condensed polyamine has 41.6 mole percent polyamine components of 6 or fewer nitrogen atoms. The temperature is increased to 155° C. and held there for 5 hours while blowing with nitrogen at 14 L/hr (0.5 cubic feet per hour). The contents are then filtered using a filtering aid to give a product having 0.997% nitrogen, a total acid number of 3.79 and a total base number of 16.85.

EXAMPLE 12

Charged to a 12 liter, 4 neck round bottom flask are 2785 parts (2.98 equivalents) of the alkenyl substituted succinic anhydride made from stripped PBU as prepared in Example 4 and 2938 parts diluent oil. The contents are heated to 110° C. and 203.2 parts (3.87 equivalents) of the condensed polyamine used in Example 11 are added in 1 hour. The temperature is increased to 155° C. and held there for 5 hours while blowing with nitrogen at 14 L/hr (0.5 cubic feet per hour). The contents are filtered using a filtering aid to give a product having 0.89% nitrogen, total acid number of 3.66 and total base number of 13.7.

The following is the preparation of the sludge preventing/seal protecting additive of a nitrogen containing dispersant based upon the reaction of (I) and (II):

The reaction products of various combinations of (I) and (II) as set forth above are blended with other conventional components typical of a heavy-duty diesel lubricant formulation (in a Group II basestock), to give a series of test samples. The amount of the dispersant to be tested in each case is 7.2% by weight (including about 50% diluent oil) of the test sample. The test samples are evaluated in the Volkswagen™ PV3344 Viton™ Seal Test. This test is designed to test compatibility of a crankcase lubricating oil that contains nitrogen-containing dispersants, that is, the reaction product of (I) and (II).

The elastomer tested is the Parker-Pradifa™ SRE AK6, which also has the designation FKM E-281. Prior to the test, the elastomer specimens are thermally conditioned at 150° C. for 48 hours in order to drive off moisture which is readily absorbed by the filler component of this elastomer.

A thermally-conditioned elastomer specimen is immersed into a volume of the test sample such that the volume of the sample:volume of the elastomer is approximately 85:1. The immersion test temperature is 150° C. and the immersion period is a total of 282 hours made up of three 94-hour periods. After the first two 94-hour periods, the test sample is replaced with a fresh test sample. At the completion of the 282-hour period, the elastomer specimens are evaluated for tensile strength, percent elongation, and cracking. Normal performance standards for this test are that the tensile strength be at least 8 newtons per square millimeter; the elongation at rupture be at least 160 percent, and there be no evidence of cracking (or alternatively "barely" evidence of cracking). Even better performance is indicated by a percent elongation of at least 190%.

Different specimens of the same samples (prepared in Group I base stocks and employing a slightly different concentration of viscosity modifier) are evaluated for soot handling capability using an accelerated version of the Mack™ T-8 test (in which soot is generated at a faster rate and using a reduced oil charged, compared with the standard test). For each sample, rotational viscosity is measured using a controlled stress rheometer with cone-and-plate geometry at $10\ s^{-1}$ at 100° C. Viscosity is plotted as a function of the percent soot in the sample. In each plot the viscosity begins to increase more or less abruptly above a certain soot concentration, from a base value of about 11 to 18 mPa·s (cP) at lower soot concentrations. In the table below, the value for "max. soot" is reported as the approximate concentration, by interpolation, at which the viscosity has increased to 50 mPa·s (cP). Higher "max. soot" values represent greater effectiveness in dispersancy and soot handling ability.

| Prod. of Ex. No. | Max Soot % | Tensile Strength (N/mm$^2$) | Elongation % | Cracking |
|---|---|---|---|---|
| 7  | 6.2 | 6.7  | 156.3 | moderate |
| 9  | 5.3 | 6.3  | 142.7 | moderate |
| 11 | 4.5 | 8.0  | 182.4 | none |
| 8  | 5.8 | 8.7  | 188.6 | barely |
| 10 | 5.7 | 8.3  | 204.4 | barely |
| 12 | 4.5 | 10.6 | 224.9 | none |

The results show that the compositions of the present invention (10 and 12) exhibit excellent seal performance. The product of Ex. 10 (using stripped polyisobutylene and stripped amines) also exhibits excellent soot handling performance. Common experience, to the contrary, indicates that modifications which improve seal performance tend to lead to poorer soot handling abilities. The material of Example 12 (using stripped polyisobutylene and condensed amine) shows outstanding seal performance, although reduced soot handling ability at the concentration employed. It is believed that the much higher molecular weight of the condensed amine results in a lower molar concentration of the dispersant, and the results should significantly improve with suitable increase in total concentration.

Testing of additional samples (also containing about 7% dispersant, which however may not be directly comparable to the samples reported above due to variations in the conventional additive package) further reveals the excellent seal performance of the compositions of the present invention (Examples 22 and 23). (It is noted that those compositions with dispersants having CO:N equivalent ratios which indicate the presence of relatively more N overall tend to exhibit more severe problems with seals, and for these materials the present invention is especially desirable.)

| Ex | type of polybutene/ type of amine in dispersant | Tensile Strength | Elongation % | Cracking |
|---|---|---|---|---|
| 13  | unstripped/typical (HPA-X)$^a$   | 7.0 | 177 | severe |
| 14  | unstripped/typical (HPA-X)$^b$   | 8.5 | 199 | barely |
| 15  | unstripped/heavy (1:1 X:PF)$^c$  | 5.6 | 148 | severe |
| 16d | unstripped/heavy (1:1 X:PF)$^c$  | 6.6 | 180 | severe |
| 17  | unstripped/heavy (1:1 X:PF)$^a$  | 6.3 | 164 | severe |
| 18  | unstripped/heavy (PF)c           | 6.0 | 159 | severe |
| 19d | unstripped/heavy (PF)$^c$        | 7.0 | 190 | moderate |
| 20  | unstripped/heavy (PF)$^a$        | 5.4 | 135 | severe |
| 21  | stripped/typical (HPA-X)$^c$     | 7.0 | 167 | barely |

-continued

| Ex | type of polybutene/ type of amine in dipersant | Tensile Strength | Elongation % | Cracking |
|----|---|---|---|---|
| 22 | stripped/heavy (1:1 X:PF)$^c$ | 8.8 | 209 | none |
| 23 | stripped/heavy (PF)$^c$ | 9.5 | 220 | none |

$^a$. CO:N equivalent ratio in dispersant 1:1.25
$^b$. CO:N equivalent ratio in dispersant 1:1.1
$^c$. CO:N equivalent ratio in dispersant 1:1.375
$^d$. also contains a $C_{16-18}$ epoxy compound The compositions of the present invention are useful in crankcase lubricants for spark-ignited and compression-ignited internal combustion engines, including automobile and truck engines, two-cycle engines, aviation piston engines, and marine and railroad diesel engines. They can also be used in gas engines, stationary power engines and turbines. Automatic transmission fluids, transaxle lubricants, gear lubricants, metal-working lubricants, hydraulic fluids and other lubricating oil: and grease compositions can also benefit from the incorporation therein of the compositions of the present invention.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

It is believed that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of amounts of substances which do not materially affect the basic and novel characteristics of the composition under consideration.

What is claimed is:
1. A composition suitable for reducing engine sludge and degradation of elastomer seals comprising
   a major amount of an oil of lubricating viscosity and
   a minor amount of a nitrogen-containing dispersant wherein the nitrogen containing dispersant is a reaction product of

(I) a hydrocarbyl-substituted succinic acylating agent, wherein 15 to about 20 mole percent of the individual molecules thereof have a hydrocarbyl substituent with a molecular weight of less than 500; wherein the hydrocarbyl substituent is a polymeric species consisting essentially of olefin monomer units of at least 3 carbon atoms; and (II) at least one polyamine, wherein the polyamine is
   (a) a polyalkylene amine containing at least one H—N< group; or
   (b) a condensate of (i) a polyalkylene amine containing at least one H—N< group with (ii) at least one alcohol containing at least one ether group, amine group, nitro group, or additional alcohol group;

wherein in said polyamine (a) or condensed polyamine (b) no more than about 20 mole percent of the molecules contain 6 or fewer nitrogen atoms.

2. The composition of claim 1 wherein the substituent groups in (I) are derived from a polyalkene characterized by a $\overline{M}_n$ value of about 1000 to about 10,000.

3. The composition of claim 2 wherein $\overline{M}_n$ is at least about 2000.

4. The composition of claim 1 wherein the substituent groups in (I) are derived from one or more homopolymers or copolymers of olefins of 3 to about 16 carbon atoms.

5. The composition of claim 4 wherein the olefins are predominantly terminal olefins.

6. The composition of claim 4 wherein the substituent groups are derived from one or more homopolymers or copolymers of olefins of 3 to about 6 carbon atoms.

7. The composition of claim 6 wherein the substituent groups are derived from polybutene, polypropylene, or mixtures thereof.

8. The composition of claim 6 wherein the substituent groups are derived from polybutene in which at least about 50 mole percent of the monomer units are isobutylene units.

9. The composition of claim 1 wherein the acylating agent is characterized by the presence within its structure of an average of at least about 1.1 succinic groups for each equivalent weight of substituent groups.

10. The composition of claim 1 wherein the acylating agent is characterized by the presence within its structure of an average of at least about 1.3 succinic groups for each equivalent weight of substituent groups.

11. The composition of claim 1 wherein the alkylene moiety of the polyalkylene amine of (IIa) or (IIb) is ethylene.

12. The composition of claim 11 wherein the nitrogen-containing dispersant is prepared by reacting (I) the hydrocarbyl-substituted succinic acylating agent with (IIa) the polyethylene polyamines.

13. The composition of claim 1 wherein for (IIa), less than about 10 mole percent of the polyamine molecules contain six or fewer nitrogen atoms.

14. The composition of claim 1 wherein for (IIa) less than about 5 mole percent of polyamine molecules contain six or fewer nitrogen atoms.

15. The composition of claim 1 wherein the alcohol of II(b)(ii) is of the formula

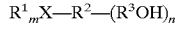

wherein:
X is O or N;
m is 1 when X is O and 2 when X is N;
each $R^1$ is independently hydrogen, a hydrocarbyl group, a hydroxyhydrocarbyl group, or, if X is N, each $R^1$ can be O so as to form a $NO_2$ group;

R² is a hydrocarbylene group or an ether-containing group, having n+1 sites of linkage R³ is an alkylene group of 1 to about 4 carbon atoms; and n is 1, 2, or 3.

16. The composition of claim 1 wherein the alcohol of II(b)(ii) is a di- or tri-ethanolamine.

17. The composition of claim 1 wherein the alcohol of II(b)(ii) is trimethylolpropane.

18. The composition of claim 1 wherein the alcohol of II(b)(ii) is pentaerythritol.

19. The composition of claim 1 wherein the alcohol of II(b)(ii) is tris(hydroxymethyl)amino methane.

20. The composition of claim 1 wherein the alcohol of II(b)(ii) is tris(hydroxyethyl)amino methane.

21. The composition of claim 1 wherein the alcohol of II(b)(ii) is a polyoxyalkylene alcohol.

22. The composition of claim 1 wherein within (IIb) the condensed polyamine is prepared by reacting about 1 to about 3 equivalent of the polyamine with 1 equivalent of the alcohol in the presence of an acid catalyst.

23. The composition of claim 1 wherein the nitrogen-containing dispersant is prepared by reacting (I) the hydrocarbyl-substituted succinic acylating agent with (IIb) the condensed polyamine.

24. A method for reducing the formation of sludge and the degradation of seals in an engine, comprising lubricating said engine with the composition of claim 1.

25. A composition suitable for reducing engine sludge and degradation of elastomer seals comprising a major amount of an oil of lubricating viscosity and a minor amount of a nitrogen-containing dispersant wherein the nitrogen containing dispersant is a reaction product of (I) a hydrocarbyl-substituted succinic acylating agent wherein the hydrocarbyl substituent is prepared from a polymeric species consisting essentially of olefin monomer units of at least 3 carbon atoms and wherein 15 to about 20 mole percent of the individual molecules of said polymeric species have a molecular weight of less than 500; and (II) at least one polyamine, wherein the polyamine is (a) a polyalkylene amine containing at least one H—N< group; or (b) a condensate of (i) a polyalkylene amine containing at least one H—N< group with (ii) at least one alcohol containing at least one ether group, amine group, nitro group, or additional alcohol group;

wherein in said polyamine (a) or condensed polyamine (b) no more than about 20 mole percent of the molecules contain 6 or fewer nitrogen atoms.

* * * * *